Figure 1:
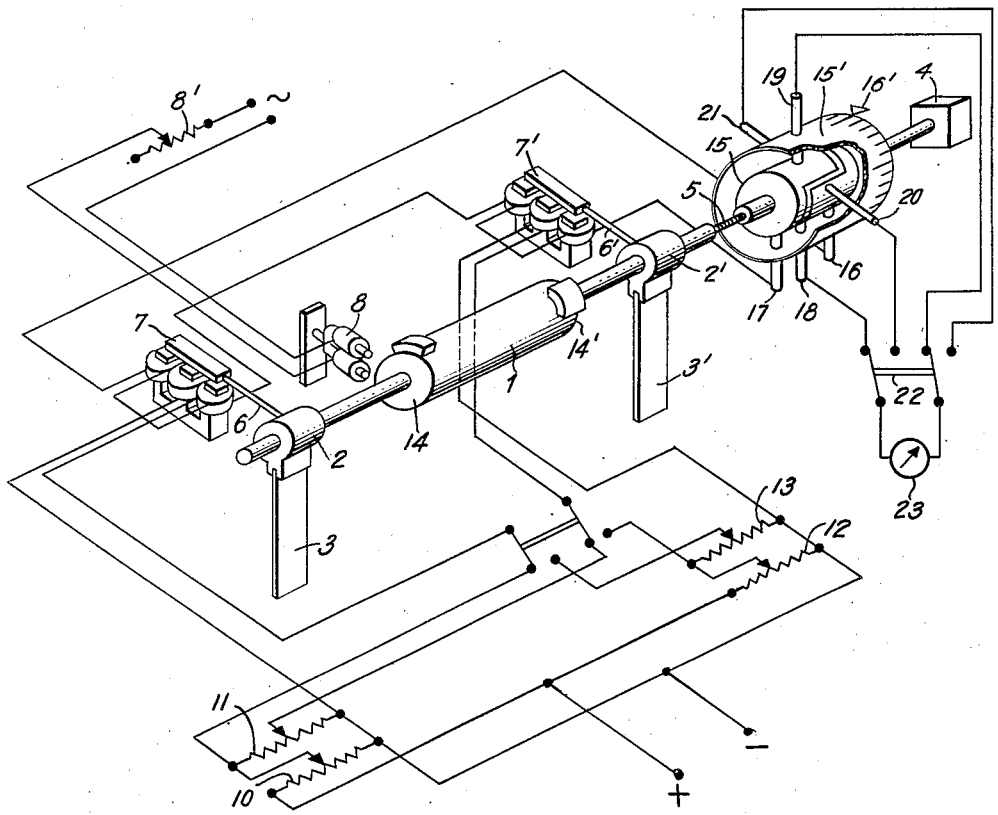

Inventors
SVEN GUNNAR SVENSSON
NILS BORJE LANGEFORS
By Haseltine, Lake & Co
AGENTS March 7, 1950   S. G. SVENSSON ET AL   2,500,013
DETERMINATION OF UNBALANCE IN ROTORS
Filed Aug. 18, 1945   4 Sheets-Sheet 2
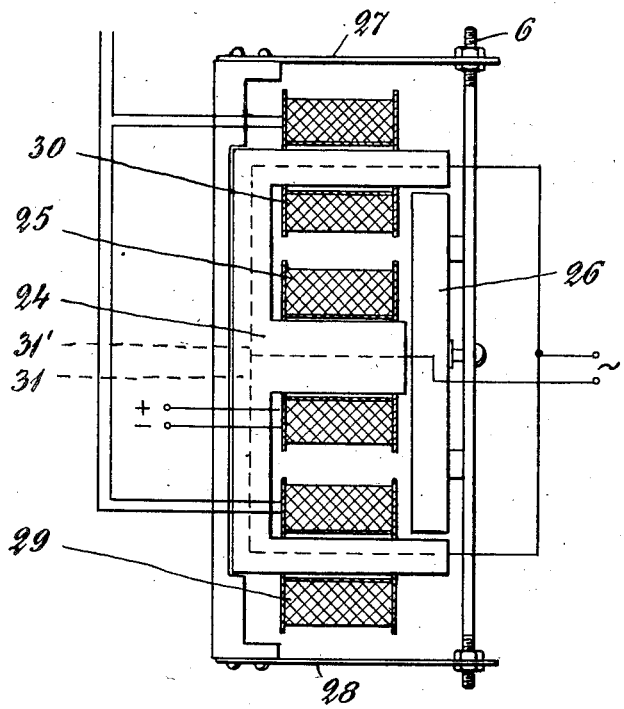
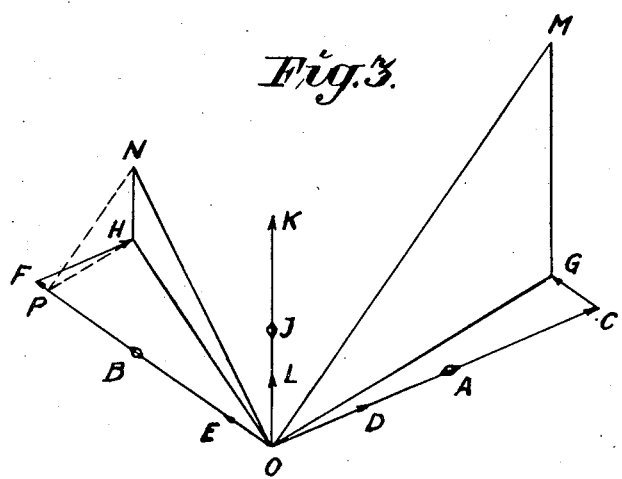
Inventors
SVEN GUNNAR SVENSSON
NILS BORJE LANGEFORS
By Haseltine, Lake & Co.
Attorneys March 7, 1950 — S. G. SVENSSON ET AL — 2,500,013
DETERMINATION OF UNBALANCE IN ROTORS
Filed Aug. 18, 1945 — 4 Sheets-Sheet 4
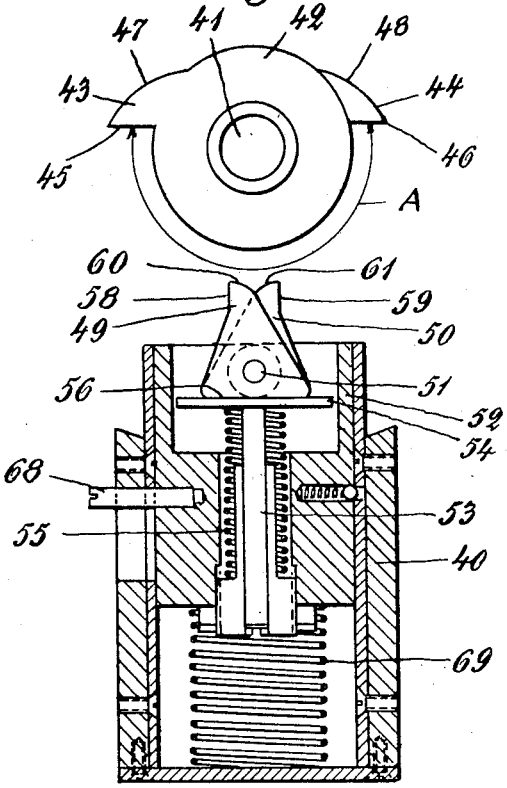
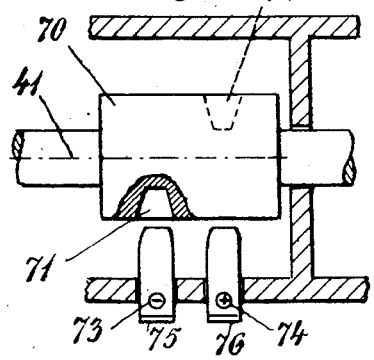
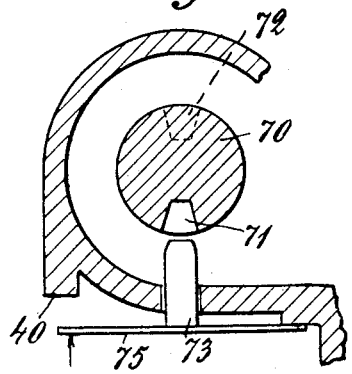
Inventors
SVEN GUNNAR SVENSSON
NILS BORJE LANGEFORS
By Haseltine, Lake & Co.
Attorneys ized Mar. 7, 1950

UNITED STATES PATENT OFFICE 2,500,013

DETERMINATION OF UNBALANCE IN ROTORS

Sven Gunnar Svensson and Nils Börje Langefors, Sundbyberg, Sweden

Application August 18, 1945, Serial No. 611,420
In Sweden August 24, 1944

7 Claims. (Cl. 73—66)

The present invention relates to an arrangement for the determination of the unbalance of a rotor by means of changing the mass distribution of the rotor in two arbitrarily chosen correction planes.

The rotor to be tested is rotated while suspended in two bearings and the mechanical vibrations thereby produced by the unbalance in two measuring planes, which are for instance adjacent to the said bearings, are employed to produce corresponding alternating currents by operating electromagnetic, electrodynamic, resistive, inductive, or capacitive vibration pick-ups, i. e. electric generators which are adapted to generate corresponding voltage oscillations when subjected to mechanical vibrations. One of the principal features of the invention is that the pick-ups are connected in series with each other and with a current indicating instrument in such a way that the instrument is fed with the vector difference of the currents. Furthermore, each pick-up is adjustable in an electrical or mechanical way as to its degree of sensitivity and is arranged while determining the unbalance in one of the measuring planes to be maintained at such a degree of sensitivity that the currents therefrom attain such proportions and strengths that the amplitude of the vector difference between the two alternating currents indicates the magnitude of the unbalance and its phase position indicates the angular position of said unbalance in the correction plane for which the unbalance is to be determined.

In hitherto known arrangements the vector addition of the currents has been performed by means of potentiometer resistors fed by the vibration pick-ups, whereby the said proportions between the currents are determined by means of these resistors. Such an arrangement has the disadvantage that only a small fraction of the pick-up efficiency can be fed to the measuring instrument. This is due to the fact that in order to avoid disturbances and especially phase disturbances the impedance of the resistors must be great in comparison with the impedance of the pick-ups. This disadvantage is entirely avoided through the present invention.

According to the invention each pick-up can be of the electro-magnetic or of the electrodynamic type and arranged to be magnetized by means of direct current, the strength of which is adjustable in order to make the degree of sensitivity of the pick-ups controllable. Such an electrodynamic pick-up is found, for example, in U. S. Patent No. 2,165,024 of July 4, 1939. In a preferred embodiment of the invention for each correction plane there may be provided two potentiometer resistors, which are connected in the direct current magnetizing circuit of the two vibration pick-ups and are so coupled that one potentiometer resistor permits the adjusting of the proportions between the magnetizing currents of the two pick-ups and thereby the proportions between their degrees of sensitivity.

The other potentiometer resistor permits the adjustment of the strength of the two magnetizing currents with unchanged proportion between these currents. A switch is provided to complete, alternately, the electrical circuit for each correction plane.

If according to the invention an electro-magnetic pick-up is used, said pick-up may be provided with a line-loop fed by alternating current in order to eliminate the action of the remanence and hysteresis in its magnetic circuit, the loop being located in a channel along the magnet core, thereby producing an alternating field perpendicularly to the magnet field of the pick-up.

For the determination of the angular position of the unbalance, which the vectorial alternating current difference indicates by means of its phase position, according to the invention there may be coupled a reversing device between the pick-ups and the current indicator device, consisting of a direct current ammeter instrument. The reversing device consists of a commutator member accompanying the rotation of the rotor and brushes located in a holder which may be turned coaxially with the rotor shaft into various angular positions about said rotor shaft. The commutator serves during a certain fraction, preferably the half, of each revolution of the rotor to cut off the connection with the pick-ups or to bring about a pole-change.

In a given angular position the direct current instrument indicates zero or maximum deflection, said angular position representing a measure of the angle between the angular position of the unbalance and a predetermined angular position of the rotatable holder of the reversing device. The reversing device may be provided with a second set of brushes arranged in the holder, the angular position of which differs 90° from the angular position of the first contact device, provision being made whereby the direct current instrument may be connected to the first or the second set of brushes by means of a switch.

Figure 4:
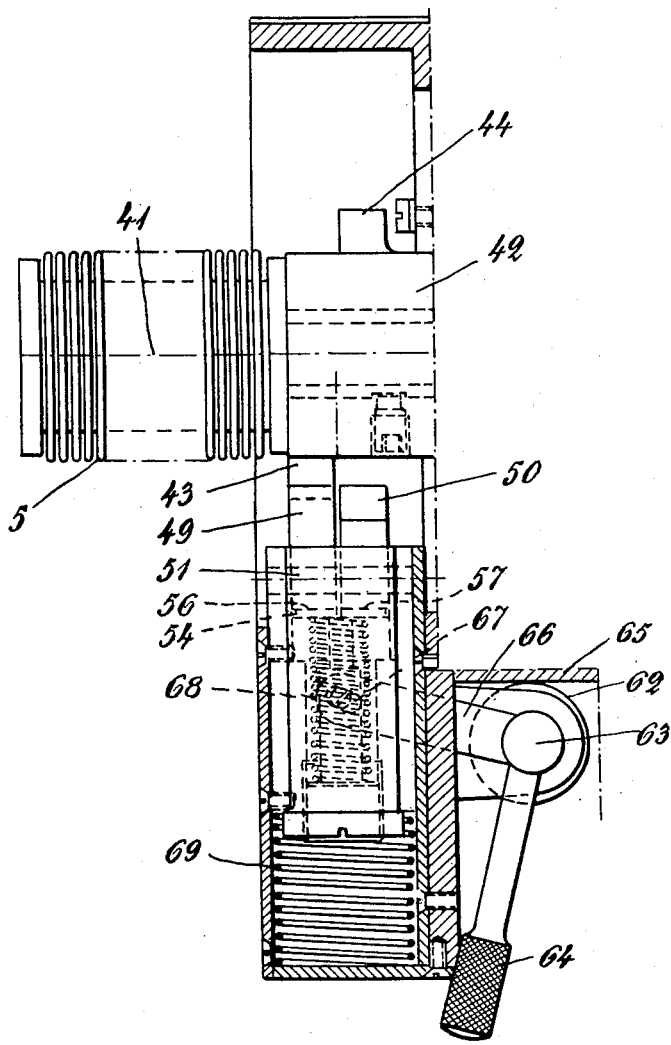

The invention and its features will be explained more in detail in connection with the description of an exemplary embodiment given for the purpose of illustrating the invention, and with reference to the drawings in which:

Fig. 1 shows a schematic view of an arrangement for the determination of unbalance, in which the invention is used; Fig. 2 shows an appertaining vibration pick-up arrangement; Fig. 3 is a diagram illustrating the basis of calculation for the determination of unbalance; Figs. 4 and 5 are sectional views of apparatus not shown in Fig. 1 but which may be attached thereto for additional ease in locating unbalance masses; and Figs. 6 and 7 are sectional views of another form of such apparatus.

In Fig. 1 the rotor to be balanced is designated by 1. The rotor is journaled in bearings 2 and 2', which are suspended in plate-springs 3 and 3'. The springs are so dimensioned that the natural frequencies of the oscillations in the horizontal plane perpendicular to the rotation shaft are far below the measuring speed, while all other natural frequencies are far above the same.

The rotor is turned by means of the motor 4 through a flexible shaft 5. Oscillations in the horizontal plane perpendicular to the rotor shaft are transmitted to the vibration pick-ups 7 and 7' by means of the bars 6 and 6'. The pick-ups here are electromagnetic vibration pick-ups with direct current magnetizing. Their magnetizing windings may be connected by means of the changing switch 9 to the potentiometer resistors 10 and 11 and 12 and 13 respectively, which are fed by a direct current source indicated with + and —. If the windings are connected to the potentiometer resistors 10 and 11, the balancing takes place in the correction plane 14, which here in the figure is located in the left hand side surface of the rotor. If the magnetizing windings are instead connected to the potentiometer resistors 12 and 13 the unbalance of the correction plane adjacent to the vibration pick-up 7' is indicated, which here coincides with the other side surface 14' of the rotor. By the aid of the potentiometer resistors 11 and 13 the proportion between the magnetizing currents of the two vibration pick-ups 7 and 7' is adjusted to the correct value for the chosen correction plane, while by the aid of the potentiometer resistors 10 and 12 the suitable current strengths are adjusted in the manner described below.

The measuring coils of the vibration pick-ups 7 and 7' are in series opposition with one another and connected to a reversing device 15.

This device consists of a commutator following the turning of the rotor 1 and two contact devices coacting therewith, of which one consists of the brushes 18 and 19 and the other of the brushes 20 and 21, to which further two common brushes 16 and 17 are added. All the brushes are arranged in one holder, here shown as a cylindrical shell 15' which has been partially broken away to show the construction of commutator 15, which is journaled coaxially with the shaft of the rotor 1 and turnable about said shaft into various angular positions. The holder is provided at one end with a scale graduated in degrees, adjacent to which is a fixed pointer 16'. The vibrator pick-ups 7 and 7' are connected to the brushes 16 and 17. The reversing device 15 is so arranged that during one half of a revolution it couples together the brushes 16 and 18 as well as the brushes 17 and 19 and during the other half of the revolution it couples together the brush 16 with the brush 19 as well as the brush 17 with the brush 18. The two brushes 20 and 21 are arranged perpendicularly to the brushes 18 and 19. The brushes 18, 19, 20 and 21 are connectable to the direct current measuring instrument 23 by the aid of the reversing switch 22, whereby alternately the brushes 18 and 19 or the brushes 20 and 21 may be connected.

The arrangement according to Fig. 1 contains also a magnet 8 which causes vibrations of the rotor 1. The magnitude of these vibrations is regulated by means of an adjustable resistance 8'. The use of this magnet will be described in later paragraphs. The mounting for the magnet 8 comprises support means s whereby the spacing of the magnet from the rotor may be adjusted.

The vibration pick-ups 7 and 7' are built according to Fig. 2. An E-shaped core 24, which preferably consists of laminated sheet-metal, has a magnetizing winding 25 wound on the middle shank.

The armature 26 is fixed to the bar 6 and the system consisting of the armature and the bar is suspended in the springs 27 and 28 so that the air gaps between the armature 26 and the outer shanks of core 24 on both sides will be equally large in the central position. Around the outer shanks are arranged the measuring coils 29 and 30, coupled in series. In the magnet core a wire coil 31, 31' is inserted. Said coil may preferably also pass through the armature to make the action greater, though this will complicate the construction. The alternating magnetizing force from this coil eliminates undesirable changes in the voltages induced in coils 29 and 30 due to hysteresis and remanence at fixed values of the direct magnetizing current.

When it is desired to determine the unbalance in a rotor to be balanced by the described arrangement, the apparatus has first to be calibrated, i. e. the correct and suitable adjustment of the four potentiometer resistors 10—13 has to be determined. This calibration can be made by means of calculation. However, it is generally simpler to use the following method of calibration.

The potentiometer resistors 10 and 12 are placed in their left hand position according to Fig. 1 and the potentiometer resistors 11 and 13 in their right hand position, while the reversing switches 9 and 22 are placed in their position according to Fig. 1. The rotor is set in rotation, and the brush holder of the reversing device 15 is turned, until zero deflection is attained on the instrument 23. Thereafter the switch 22 is placed in its other position. The deflection of the instrument 23 and the angular position of the holder are read. Then the switches 9 and 22 are reversed, and a similar determination is made for this condition. The rotor having been stopped, a known unbalance is arranged in the plane 14 in an arbitrarily chosen direction, and the above described measurements are repeated, whereafter the procedure is made with a likewise known unbalance in the plane 14'.

The deflections of the indicating instrument are substantially proportional to the magnitudes of the unbalances and the angular relations between the unbalances in each plane of measurement are indicated by the angular scale associated with the turnable brush holder. From these known quantities calibration determinations may be made.

How these determinations are made is shown in Fig. 3 in which rotating vectors represent the unbalances. OA designates an unbalance in the plane 14 and OB an unbalance in the plane 14'. OC and OD illustrate the influence of OA in the bearings 2 and 2' respectively, whereby $OD=k_1OC$, where $k_1$ is a constant, which is dependent on the design of the rotor and the position of the correction plane 14. OE and OF illustrate the influence of OB on the bearings 2 and 2' respectively, whereby $OE=k_2OF$, where $k_2$ is another constant, which is dependent on the design of the rotor and the position of the correction plane 14'. $OG=OC+OE$ thus illustrates the resulting influence of the two unbalances in the bearing 2, and $OH=OF+OD$ illustrates the corresponding resulting influence in the bearing 2', i. e. OG and OH illustrate the measured magnitudes.

If now an unbalance OJ is placed in the plane 14, this will cause a deflection OL in the bearing 2', whereby $OL=k_1OK$. When these vectors are added to OG and OH respectively, the vectors OM and ON respectively are obtained, which illustrate the new measured magnitudes in the bearings 2 and 2' respectively. If now a line is drawn from H and parallelly to OG, this will cut the vector OF in P. $\triangle$ HPF is similar to $\triangle$ OCG as the sides in question are parallel. Thus $HP=k_1OG$ and $PF=k_1CG=k_1OE$, where $k_1$ is a constant. If now a line is drawn from N and parallelly to OM, this will cut HP in P'. $\triangle$ HNP' is similar to $\triangle$ GMO as the sides are parallel. Thus $HP'=k_1OG$. HP' is also as great as HP, thus P coincides with P', which consequently is located on the vector OF.

The vector OP thus obtained represents the oscillation of bearing 2', which is in phase with the unbalance in the plane 14', taking into account the effect of the unbalance in the plane 14. The vector FP is proportional to this effect and is 180° out of phase with OP. Since $$k_1CG=k_1OE=FP$$

and $CG=OE=k_2OF$, then $FP=k_1k_2OF$. From these relations, $OP=OF-FP=OF-k_1k_2OF$ or $OP=OF(1-k_1k_2)$.

With the knowledge of the magnitudes of the various vectors and their phase relations obtained as described above, the potentiometer settings may now be made. Resistor 11 is set in such a way that the relation between the sensitivity of pick-up 7' and that of pick-up 7 will be equal to $k_2$, whereas resistor 13 is set so that the relation between pick-up 7 and that of pick-up 7' will be equal to $k_1$. Resistor 10 is set so that the deflection of meter 23 will be equal to $1/(1-k_1k_2)$ times the desired deflection caused by the existing unbalance in the plane 14, whereas resistor 12 is set so that the meter deflection will equal $1/(1-k_1k_2)$ times the deflection caused by the existing unbalance in plane 14'.

If there is a phase difference between the unbalance and the voltage derived therefrom owing to mechanical, magnetic and/or electrical resistance, this will be seen in the diagram as an angle between the vectors OJ and GM. The measured angular position for an unbalance then has to be corrected by this angle.

The measurement of the unbalances of the rotor is then quite simple. The four potentiometer resistors are set on the determined values and the changing switch 9 in the left hand position according to Fig. 1 and the rotor is set in rotation. Thereafter the changing switch 22 is set in one position and the holder of the reversing device 15 is turned until the instrument 23 indicates zero. Then the switch 22 is reversed and the deviation of the instrument 23 is read, which indicates the unbalance in the plane 14.

The same determination is thereafter made with the switch 9 in the right hand position, whereby the unbalance in the plane 14' is obtained. The angular position of the unbalances are determined on the basis of the angular positions which the holder has when the meter reads zero.

The arrangement may be varied in many respects without departing from the idea of the invention. For instance, measurement may be made at oscillation frequencies that are below the natural frequency of the oscillating system, when vibration pick-ups with small motion amplitude are used.

It may also be begun by adjusting the holder on the angular position for which the instrument indicates the maximum deflection. However, this does not give so exact an adjustment as the maximum is the flattest part of a sine-curve and the zero-point the steepest one. The rotor may be set in rotation, for instance by blowing with compressed air, thus eliminating the motor.

The calibration procedure, which is described in connection with the vector diagram in Fig. 3 is not so suitable for unskilled persons, and in addition to that somewhat time consuming. Another method used for the calibration consists in arranging an already balanced rotor in the device provided for the determination of unbalance. If this device is shaped as shown in Fig. 1, the adjustment of the potentiometer resistors 11 and 13 is thereby so chosen that the instrument 23 gives a zero-deflection for one or the other correction plane when an unbalance producing mass is arranged in the other or first correction plane respectively. Thereafter a suitable scale for the strength of current is chosen by means of a corresponding adjustment of the potentiometer resistors 10 and 12. This procedure has, however, the disadvantage that an already balanced rotor has to be provided for the calibration.

The said disadvantages are avoided if a vibration source i. e. the magnet 8 is used for the calibration, which source in operation near the stationary rotor influences said rotor in each correction plane with a preferably sinusoidal, variable mechanical force, which preferably is adjustable with respect to its magnitude. This vibration force may have the same frequency as the rotation frequency at which the rotor has to be balanced or another suitable frequency. In this way utilization is made of the fundamental circumstance that unbalances existing in a stationary rotor, which is arranged according to Fig. 1, do not cause any oscillations so that the rotor in this respect acts in the same way as a rotating, perfectly balanced rotor. The vibration source may, according to the invention, consist of an electromagnet fed by alternating current or by alternating and direct current and alternately attracting and repelling the rotor or a member of magnetic material connected to the rotor.

Such a magnet may be arranged in a simple way perpendicular to the rotor and adjustably distant from the rotor shaft in the required stand for the unbalance determination device.

By the aid of one of the foregoing arrangements it is possible in a simple way to carry out the adjustment of the proportions between the degrees of sensitivity of the two vibration pick-ups determined by the positions of the measurement planes and the correction planes, while the vibrations in the rotor caused by the vibration force and in the two measurement planes of the same are used for the adjustment of the degree of sensitivity by adjusting the potentiometers that the indicating device shows full balancing of the correction planes in which the vibration force does not attack. If for instance the arrangement 8, 8' shown in Fig. 1 is provided, then it has firstly to be taken into consideration that the instrument 23 cannot be connected to the reversing device 15 as said device as well as the rotor has to be stationary during the calibration. Instead of that the instrument is connected to the coupled vibration pick-ups 7 and 7' by means of a rectifier.

If in this arrangement a vibration force is incident in the correction plane 14' with a stationary rotor the switch 9 has to be placed in the position according to Fig. 1 and the potentiometer resistor 11 is adjusted to the position in which the instrument 23 indicates zero. Thereby the potentiometer resistor 11 is adjusted to the proportion valid for full balance of the correction plane 14'. A similar calibration is performed for potentiometer 13.

It is also possible to adjust suitable values for the degree of sensitivity of the two vibration pick-ups in the following way. After accomplishment of the above described procedure for the adjustment of the proportion of sensitivity the angular position of the predetermined unbalance at the rotor is determined in each correction plane in the ordinary way. After this the deflection of the current indicating device representing the magnitude of the unbalance is read, after which a balancing mass known with respect to its magnitude is connected to the rotor in correct position and the rotor is set again in rotation and the new deflection obtained therewith is read. Then the rotor is again brought to a stop and the vibrational force is permitted to attack in the same correction plane and adjusted to such a magnitude that the obtained deflection of the current indicating device corresponds to the difference between the two first-mentioned deflections. Finally the degree of sensitivity of the vibration pick-ups is so adjusted that for the same vibrational force is obtained a deflection which is considered to stand in a suitable proportion to the weight of the balancing mass put on for the following balancing.

If for instance the arrangement 8, 8' according to Fig. 1 is not provided for carrying out the last described procedure, the potentiometer resistors 11 and 13 have to be correctly pre-adjusted. In this case the instrument 23 is connected to the reversing device 15. The rotor is set in rotation and the angular positions of the presumed unbalances in the rotor are determined in the manner described in connection with Fig. 1. Then the instrument deflections obtained with a rotating rotor are read for these angular positions, the deflections representing the magnitude of the unbalance in the two correction planes. Thereafter known weights $M^1$ and $M^2$ are arranged in correct angular positions in the two correction planes after which the instrument deflections at rotating rotor are read again for the two correction planes. The instrument deflections corresponding to the known weights are now determined by means of subtraction of the last obtained instrument deflections from the foregoing deflections. By the aid of the calibration switch then the instrument 23 is connected directly to the vibration pick-ups 7 and 7' through the rectifier. After the rotor has been stopped the vibrational force, which for instance may be obtained from a magnet, is caused to act in one correction plane, after which the strength of the vibrational force is adjusted, for instance by changing a series resistance in the feed circuit of the magnet until the instrument 23 indicates the said difference value in the deflection for these correction planes.

Hereby a measure is obtained for the scale in which the instrument deflection represents the known unbalance weight. If this scale is considered less suitable with respect to the following unbalance determination for these correction planes, the corresponding potentiometer resistors 10 and 12 respectively are reset until a deflection on the indicating device is obtained that corresponds to a suitable scale. A perfectly analogous procedure is then carried out for the other correction plane.

In unbalance determination by aid of the arrangement according to Fig. 1 it is supposed that for each correction plane is read the angular position of the holder of the reversing device that corresponds to the angle position of the unbalance of these correction planes, after which by measuring the angle at the rotor itself the point is determined where the balancing weight has to be placed. This procedure is time wasting and uncomfortable and involves furthermore the danger of making errors at the determinations.

These disadvantages are avoided by aid of a device which is principally characterized by the fact that the holder of the reversing device is provided with two centering members which together or separately are displaceable into and out of the motion tracks of two corresponding centering members of the rotatable member of the reversing device, whereby the position of the centering members of the holder and the angular position of the centering members of the rotatable member are so chosen in relation to the rotor in the following manner.

When the holder for the unbalance determination is adjusted in each correction plane to an angle, at which the direct current instrument which is connected to the contact device 18, 19 or 20, 21 indicates a predetermined deflection, preferably zero, when further the holder is fixed in this position, and when the rotor thereafter is manually turned until an engagement between a centering member of the holder and the corresponding centering member of the commutator is obtained, the angular position of the rotor is so centered that the point in this correction plane in which the required balancing mass has to be arranged always is located at a predetermined angle to a stationary direction, for instance always perpendicular over the rotor shaft.

Actually it is necessary that the pointer 16' and the zero mark on the scale in the holder be initially positioned with respect to some preselected fixed reference point on the rotor being tested. But as the rotor and the reversing device are rotatably coupled together, it is possible to use a preselected fixed reference point on the reversing device, for instance one (46 in Fig. 5) of the two centering members on the reversing device. The correct position of the rotor is obtained by means of the centering member 46 and the corresponding centering member 59 of the holder.

In Figs. 4 and 5 40 designates a part of the holder of the reversing device 15 of Fig. 1. This holder 40 is rotatable about the centre line 41 of the rotor. Into the holder 40 the flexible shaft 5 extends, which is coupled to the rotor shaft and on which is fixed a member 42 following the rotation of the rotor.

The rotatable member 42 is provided with two axially separated centering stops 43 and 44, each of which being provided with an abutment surface 45 and 46 respectively for the centering engagement and a roll off surface 47 and 48 respectively, located on the opposite side. This construction is most clearly shown in Fig. 5.

With the centering members 43 and 44 coact two abutment members 49 and 50 belonging to the holder 40 and acting as centering members. They are rotatable about a trunnion 51, which is fixed in a socket 52 displaceable in the holder 40, the displacement plane of which is located radially to the centre line 41 in the present example. In the socket 52 is displaceably mounted a bar 53 parallel to the displacement plane of the socket 52. The bar 53 carries at the side facing the abutment members 49 and 50 a plate 54 at a right angle to the bar 53, which holds a spring 55 pressed against a plane surface 56 and 57 respectively provided at each abutment member 49 and 50. In this way the abutment members 49 and 50 are normally held adjusted in the turning position about the trunnion 51 determined for the centering engagement. In this turning position the abutment surface 58 of the abutment member 49 is turned to the left, while the abutment surface 59 of the abutment member 50 is turned to the right. The roll off surfaces of the abutment members 49 and 50 opposite to the abutment surfaces 45 and 46 are designated by 60 and 61 respectively.

The holder 40 is provided with a locking device, by aid of which the holder may be locked in a position for making possible the engagement between a centering member, for instance 49, of the holder and the corresponding centering member 43 of the rotatable member 42 without simultaneous change of the turning position of the holder 40. This locking device as seen in Fig. 4 consists of an eccentric disc 62 on which an operating handle 64 is arranged. By displacement of this handle the eccentric disc 62 may be brought in or out of engagement with a fixed abutment 65. On the trunnion 63 an arm 66 is further fixed, the free end of which is provided with an elongated hole 67 engaging with a guiding pin 68 rigidly connected to the socket 52. By means of this the locking device is connected with the socket 52 and thereby with the two centering members 49 and 50 of the holder in such a manner that the action of the locking device causes simultaneously a displacement of the two centering members 49 and 50 into the paths of motion of the two offsets 43 and 44. If the locking device is released, then simultaneously the centering members 49 and 50 of the holder are pulled out of the said paths of motion. For supporting the locking obtained by the locking device the socket 52 coacts with a pressure spring 69, which tends to hold the socket in the locking position.

By using two centering members on the rotatable member 42 as well as on the holder 40 it is possible to limit the turning of the holder within a range of 180°. This is generally of advantage in that the contact arrangement of the holder may in this manner be made without slip-rings for the supply line. If the turning range of the holder is limited to 180°, then the holder 40 can be brought to one of the two angular positions for which the direct current instrument during rotation of the rotor gives a zero-deflection. For determining in which direction the rotor has to be turned for centering on the adjusted holder position, one uses the indication change, which the deflection of the direct current instrument indicates when turning the holder while revolving the rotor in such a manner that the position of the zero-deflection of the instrument is passed. In the most simple way this indication change is determined by an arrangement according to Fig. 1, which in the above described manner is provided with a second contact device similar to device 15 comprising, for example, brushes 20, 21 and 18, 19 respectively. This second contact device, connectible to a special switch 22, is displaced 90° with respect to the first contact device, and gives the instrument deflection of a turning position of the holder displaced 90° from the angle position of the zero-deflection without changing the turning position of the holder. The direction in which the rotor has to be turned for centering is thus predetermined by the indication of the deflection of this instrument.

The use of the arrangement according to Figs. 4 and 5 is now described under the supposition that it is used in an arrangement according to Fig. 1.

At first the angular position is determined by turning the holder 40 while rotating the rotor, to the position for which the direct current instrument shows a zero-deflection for one correction plane. Thereafter the switch 22 is changed, after which while rotating the rotor was unchanged adjustment of the holder the magnitude and the direction (+ or −) of the obtained deflection of the instrument is read.

Then the rotor is brought to a stop and the handle 64 is switched to locking position. The abutment members 49 and 50 thereby will be displaced into the path of motion of the centering offsets 43 and 44, which will be placed in the positions shown in Fig. 5. Now the rotor will be turned manually in the direction that is predetermined by the read indication of the instrument deflection, for instance clockwise, until the abutment surface 46 abuts against the abutment surface 59. The rotor is thereby centered in such a turning position that the point at which the balancing mass has to be placed in the investigated correction plane is located perpendicularly over the rotor shaft. At this point then a balancing mass is placed, the weight of which is determined on the basis of the magnitude of the deflection of the instrument. The same procedure is used for the balancing of the other correction plane.

Alternately it may be started by determining for both correction planes the centering angle positions and the corresponding deflections of the instrument, which are obtained by aid of the changing switch 22 and thereafter placing the balancing weights in the two correction planes. In this procedure, however, at least one of the centering angle positions has to be indicated.

Were the rotor stopped in such a position that the abutment members 49 and 50 are not in angle range A according to Fig. 5, then the rotor has to be turned manually in the direction determined by the indication of the deflection of the instrument and so that one centering offset, for instance 44, passes one of the abutment members, for instance 50.

This is possible due to the yielding of plate 54 against which the surface 57 of the abutment member 50 is pressed on account of the engagement between the roll off surfaces 48 and 61. The turning of the rotor is then continued in the chosen example until the abutment surface 45 of the offset 43 abuts against the abutment surface 58 of the abutment member 49. For making it possible to observe the difference between such a passing engagement as that just described and a real centering engagement the shape of the abutment surfaces 45, 46, 58 and 59 as well as the roll off surfaces 47, 48, 60 and 61 and the shape of the surfaces 56 and 57 are chosen in such a manner that the abutment members 49 and 50 at centering engagement produce a considerably greater resistance against the continued turning of the rotor shaft than at the engagement between the roll off surfaces 47, 48, 60 and 61. The abutment members 49 and 50 are, however, by their coaction with the plate 57 yieldingly arranged also at centering engagement in order to avoid damage on account of too great torques, which for instance might appear, if the locking device is operated due to carelessnes while the rotor is still rotating.

Instead of the arrangement shown in Figs. 4 and 5 with only one yielding plate 54 common to the two abutment members 49 and 50 it is evident that an arrangement with a yielding plate for each abutment member may be used.

In balancing large rotors it may be difficult by using the arrangement according to Figs. 4 and 5 to determine by feeling if the engagement between the centering members is a centering engagement or a passing engagement. In such cases an arrangement according to Figs. 6 and 7 may be more suitable. In this arrangement the required locking of the holder is effected by means of suitable arrangements which, for purposes of simplicity, are not shown.

In Figs. 6 and 7, 70 designates the rotatable member, which is provided with two recesses 71 and 72, which are arranged diametrically to each other in relation to the rotor shaft 41 and in different axial positions. With each of the two recesses 71 and 72 a corresponding pin 73 and 74 respectively coacts, each of which is fixed to a laminated spring 75 and 76 respectively. These laminated springs are fixed with one of their ends in the holder 40. By manual action of the free end of the spring 75 and 76 respectively towards the rotor shaft the pin 73 and 74 respectively may be brought to centering engagement with the corresponding recess 71 and 72 respectively after the rotor by manual turning has been brought to the centering position determined by this engagement.

The arrangement according to Figs. 6 and 7 is provided for a holder, which only may be turned within an angular range of 180°, therefore the arrangement shows two centering pins.

The use of the arrangement according to Figs. 6 and 7 is analogous to the description of the use of the arrangement according to Figs. 4 and 5. It is only necessary to observe that one of the pins, for instance 73, is to be used when the instrument has made a minus-deflection, while the other pin 74 is used for the plus-deflection. Thereby the turning direction of the rotor for the adjustment of the centering position is arbitrary.

The springs 75 and 76 are preferably made so soft that, so long as the rotor is still rotating, the pins 73 and 74 are not capable of entering their corresponding recesses 71 and 72.

Having now particularly described the nature of our invention and the manner of its operation, what we claim is:

1. Apparatus for determining the magnitudes and angular dispositions of unbalances existing in a rotatable body, comprising means for mounting said rotatable body so that it is capable of rotation, said mounting means including spring means so that said body may vibrate in a plane substantially parallel to its axis of rotation, means for controllably rotating said body, a plurality of electro-mechanical transducers actuated by said mounting means for generating electrical signals substantially in accordance with the magnitude and frequency of the vibrations of said mounting means, first means for controlling the magnitude of the output of each of said electro-mechanical transducers with respect to the outputs of the others of said transducers, first means for controlling the magnitudes of the outputs of the various transducers simultaneously while maintaining the proportional relation between said outputs, second means for controlling the proportionality of output from said transducers and second means for controlling the outputs of all of said transducers simultaneously similar to said first means for accomplishing both results, means for alternately connecting said first or said second control means to said transducers, commutator means rotatable with said rotatable body so that its speed of revolution is in a predetermined relation to the speed of revolution of said body, first contact means cooperating with said commutator to impress electrical energy onto said commutator, means for electrically interconnecting said transducers to each other to combine their outputs and to said first contact means in series opposition, second contact means for removing electrical energy from said commutator, the electrical energy removed from said commutator being substantially the electrical wave energy derived from said transducers with its wave shape altered through action of said commutator, holder means for supporting and rotating said first and second contact means coaxially to said commutator means independently of motion of said commutator means and means electrically connected to said second contact means for indicating the direct-current component of the electrical energy applied to said second contact means.

2. Apparatus in accordance with claim 1 wherein said electromechanical transducers each comprise a ferromagnetic core member, a magnetizing winding carrying a substantially unidirectional current disposed on said core, first and second pick-up windings also disposed on said core, a ferromagnetic armature member spring-mounted so that it approaches said core in the vicinities of said first and second pick-up windings and mechanical coupling means connecting said armature and one of said vibratable mountings so that motion of said mounting is communicated to said armature, altering the width of the gaps between said armature and said core and the reluctance of the magnetic circuits including said pick-up windings, thereby inducing in said pick-up windings electromotive forces substantially proportional in magnitude to the displacements of said armature.

3. Apparatus in accordance with claim 1 wherein each of said electro-mechanical transducers comprises a laminated ferromagnetic core member substantially E-shaped, a first magnetizing winding adapted to carry unidirectional currents disposed on the center arm of said core, a first pick-up winding disposed on one of the outer arms of said core, a second pick-up winding disposed on the other outer arm of said core, said pick-up windings being serially interconnected, an armature member flexibly mounted between the outer arms of said core and being free to move alternately toward each of said outer arms thereby altering the reluctance of the magnetic circuit including each pick-up winding and hence the magnetic flux cutting each of said windings, and a second magnetizing winding adapted to carry alternating currents disposed in said core member so that its magnetic field is substantially perpendicular to the magnetic fields due to currents flowing in said first magnetizing winding in order that the magnetizing effect of said second magnetizing winding may reduce remanence and hysteresis effects in said core member, whereby mechanical agitation of said armature produces electromotive forces in said pick-up windings substantially proportional in frequency and instantaneous magnitude to the frequency and instantaneous magnitude of said mechanical agitation.

4. Apparatus in accordance with claim 1 wherein said electro-mechanical transducers are of the electromagnetic type including a magnetizing circuit carrying uni-directional currents and said means for controlling the outputs of said electro-mechanical transducers comprise potentiometer means connected in the electrical circuits of said transducers in such a fashion the proportional relation between the magnetizing currents in the various transducers may be altered, thereby altering their sensitivity of operation, and also so that the magnetizing current in each may be altered simultaneously with unchanging proportion between the different currents.

5. Apparatus in accordance with claim 1 wherein said commutator means comprises a substantially cylindrical conducting body divided into two sections, said first contact means comprises brush means making continuous electrical contact with each of the two sections of said commutator, and said second contact means comprises brush means making alternate contact with the two sections of said commutator, whereby oscillatory electrical energy impressed on said commutator by said first brush means is rectified by said commutator.

6. Apparatus for determining the magnitudes and angular dispositions of unbalances existing in a rotatable body, comprising means for mounting said rotatable body so that it is capable of rotation, said mounting means including spring means so that said body may vibrate in a plane substantially parallel to its axis of rotation, means for controllably rotating said body, a plurality of electro-mechanical transducers actuated by said mounting means for generating electrical signals substantially in accordance with the magnitude and frequency of the vibrations of said mounting means, first means for controlling the magnitude of the output of each of said electro-mechanical transducers with respect to the outputs of the other of said transducers, first means for controlling the magnitudes of the outputs of the various transducers simultaneously while maintaining the proportional relation between said outputs, second means for controlling the proportionality of output from said transducers and second means for controlling the outputs of all of said transducers simultaneously similar to said first means for accomplishing both results, means for alternately connecting said first or said second control means to said transducers, commutator means rotatable with said rotatable body so that its speed of revolution is in a predetermined relation to the speed of revolution of said body, said commutator having two recesses formed therein on opposite sides of said commutator and axially displaced from each other, first contact means cooperating with said commutator to impress electrical energy onto said commutator, means for electrically interconnecting said transducers to each other to combine their outputs and to said first contact means in series opposition, second contact means for removing electrical energy from said commutator, the electrical energy removed from said commutator being substantially the electrical wave energy derived from said transducers with its wave shape altered through action of said commutator, holder means for supporting and rotating said first and second contact means coaxially to said commutator means independently of motion of said commutator means, means electrically connected to said second contact means for indicating the direct current component of the electrical energy applied to said second contact means, two centering members each adapted to be received in one of the recesses in said commutator, said centering members being so positioned on the holder means with respect to said first and second contact means that, after rotation of said holder means to obtain a predetermined indication of said indicating means and after stopping rotation of the body and commutator engagement of one of said centering members with its corresponding recess in the commutator while said commutator is stationary causes said rotatable body to be positioned with its unbalances in a predetermined relation to a fixed reference point.

7. Apparatus in accordance with claim 6 including spring means yieldably resisting displacement of said centering members.

SVEN GUNNAR SVENSSON.
NILS BÖRJE LANGEFORS.

REFERENCES CITED

The following references are of record in the file of this patent:

UNITED STATES PATENTS

| Number | Name | Date |
|---|---|---|
| 1,639,444 | Terry | Aug. 16, 1927 |
| 2,054,267 | Ohlson | Sept. 15, 1936 |
| 2,165,024 | Baker et al. | July 4, 1939 |
| 2,165,992 | Westendorp | July 11, 1939 |
| 2,219,795 | Van De Grift | Oct. 29, 1940 |
| 2,289,074 | Rushing et al. | July 7, 1942 |
| 2,322,561 | Bevins et al. | June 22, 1943 |
| 2,348,922 | Pekar | May 16, 1944 |
| 2,382,843 | Annis | Aug. 14, 1945 |